UNITED STATES PATENT OFFICE.

JOHN A. JUST, OF SYRACUSE, NEW YORK.

ARTIFICIAL ASPHALT.

SPECIFICATION forming part of Letters Patent No. 651,358, dated June 12, 1900.

Application filed September 18, 1899. Serial No. 730,846. (No specimens.)

*To all whom it may concern:*

Be it known that I, JOHN A. JUST, of Syracuse, in the county of Onondaga, in the State of New York, have invented a new and useful Artificial Asphalt, of which the following is a full, clear, and exact description.

My invention relates to the production of an artificial asphalt from the "acid tars" resulting from the refining of mineral oils by concentrated acids.

My new composition may be used in place of natural asphalt in all situations, but is superior thereto in purity, in uniformity, and in being absolutely waterproof.

In refining the crude petroleum is first distilled and the various products of the distillation refined and purified by mixing therewith concentrated sulfuric acid, which carbonizes or carries away the organic substances there in suspension or solution, separating them in the form of a strongly-acid tarry residue, commonly called "acid tar" or "acid sludge." The exact chemical composition of this substance has not been determined; but it consists chiefly of hydrocarbons belonging to the unsaturated hydrocarbon group. This substance is produced in large quantities in the purification of petroleum and has been considered as worse than useless, for it is so foul and its fumes are so noxious and dangerous to animal and vegetable life that it has been necessary to dispose of it with considerable trouble and expense. Attempts have been made to use it for fuel mixed with a neutralizing material and with coal, but without much success. I have discovered that by a simple and cheap process this material may be converted into a true artificial asphalt.

I produce my new composition by first neutralizing the acid tar and then thoroughly combining therewith when heated a limited amount of sulfur, varying from five to twenty per cent., in proportion to the degree of hardness desired in the finished product. The process may be more or less varied; but the following gives satisfactory results with least difficulty from noxious vapors during the manufacture. The acid tar so produced from the kerosene, &c., in the process of purifying is first freed from the adhering acid in any suitable way, as by washing or neutralizing by lime, soda, &c., and heating to 350° or 450° Fahrenheit. To three hundred and fifty parts, by weight, of this neutralized acid tar twenty to seventy parts, by weight, of sulfur are added, a portion at a time, the amount of sulfur varying according to the hardness desired in the finished product. It is preferable to add the sulfur gradually, as hereinafter described, for if added all at once the reaction is too violent, great care is required in watching and controlling the mass, and an excessive amount of noxious gases given off. Therefore I prefer to first heat the neutralized acid tar to about 300° to 330° Fahrenheit and at this temperature add thereto about one-third of the total amount of the sulfur. The temperature now rises to about 380° to 390° Fahrenheit, vapors rise freely, and a strong chemical action is manifest, the mass increasing in volume about one-third. When this action has fairly subsided, about the second third of the sulfur is added and thoroughly mixed therewith, the temperature again rising and the mass increasing to about double its original volume. When this second reaction has subsided, the original degree of heat being constantly maintained, the remainder of the sulfur is added, on which the temperature rises a third time to about 380° to 400° Fahrenheit, and the entire mass is transformed to a frothy condition, which is desirable in order that every particle of the neutralized acid tar may be uniformly mixed and combined with the sulfur, producing an absolutely stable and uniform product from this complicated and varying substance. The temperature is now maintained at 350° to 400° Fahrenheit, or even higher, until the gas has escaped, the frothy condition has disappeared, and the mass settled. This high temperature facilitates escape of the gas and prevents condensation thereof in the mass, where it would act as a solvent. After the gas is all driven off the product is absolutely stable.

Throughout the whole process it is advisable to keep up a constant agitation, which promotes the combination of the materials and facilitates the expulsion of the gases, preventing the frothy mass from rising too high. After this final reaction has subsided and the mass cooled this finished product may be removed and packed in suitable packages.

The product can be varied in hardness easily and uniformly, for use in different situations and climates, by allowing more time for the subsidence of the frothy condition between the adding of the various amounts of surfur or by using more or less sulfur, the more sulfur the harder the product. The softest form should not stick to the fingers or teeth after it has cooled and should be finished at a temperature above the melting-point of sulfur at lowest, the best temperature, however, being about 315° Fahrenheit; but while this temperature is preferred it will be understood that a temperature of a less degree may be employed, but never below the melting-point of sulfur.

As suggested, this product answers all the tests of the natural asphalt, and is superior thereto in several important particulars. It may always be produced of a uniform quality, harder or softer, as desired. It contains no impurities. It is practically a pure material, whereas natural asphalt contains a large proportion of mineral impurities. It is superior in its resistance to atmospheric influences and in being waterproof even when mixed with sand, &c., for paving purposes, whereas natural asphalt when so mixed is far from waterproof. I have thus converted a valueless and noxious substance varying and unstable in its composition and condition into this stable and useful article.

I am aware that it has been proposed to produce an artificial asphalt from crude petroleum or the residue of petroleum remaining in the still after distillation by treating it with sulfur and heat; but those materials then left in the still, known as "B. S.," are mostly saturated hydrocarbons, entirely different from the acid tar produced by combining the sulfuric acid with kerosene, &c., that I make use of, those saturated hydrocarbons not combining with the sulfur, the sulfur merely modifying and thickening the B. S. and producing a resultant product essentially different from mine. Such modified B. S. is not an asphalt, is useful only as a flux, and has little of the tensile strength absolutely necessary for pavements, while mine is an asphalt of a high tensile strength and particularly suitable for paving purposes.

Having thus fully described my invention, what I claim, and desire to protect by Letters Patent, is—

1. The herein-described process of making artificial asphalt from "acid tar," which consists in neutralizing the acid, heating the "acid tar" above the melting-point of sulfur and mixing sulfur therewith.

2. The herein-described process of making artificial asphalt from "acid tar," which consists in neutralizing the acid, heating the "acid tar" above the melting-point of sulfur and mixing from five to twenty per cent. of sulfur therewith while heated.

3. The herein-described process of making artificial asphalt from "acid tar," which consists in neutralizing the acid, heating the "acid tar" above the melting-point of sulfur and combining therewith while so heated from five to twenty per cent. of sulfur, said sulfur being added a portion at a time, the succeeding portions being added after the active reaction caused by the preceding portions has practically subsided, and after the sulfur has been added, maintaining the mass at a temperature of over 350° Fahrenheit until substantially all the gas has been driven off.

In testimony whereof I have hereunto signed my name.

JOHN A. JUST. [L. S.]

Witnesses:
 ALFRED WILKINSON,
 M. T. BROWNELL.